June 26, 1923.
E. J. COLGAN
BATTERY SHOCK ABSORBER
Filed Feb. 10, 1921
1,459,973
2 Sheets-Sheet 1
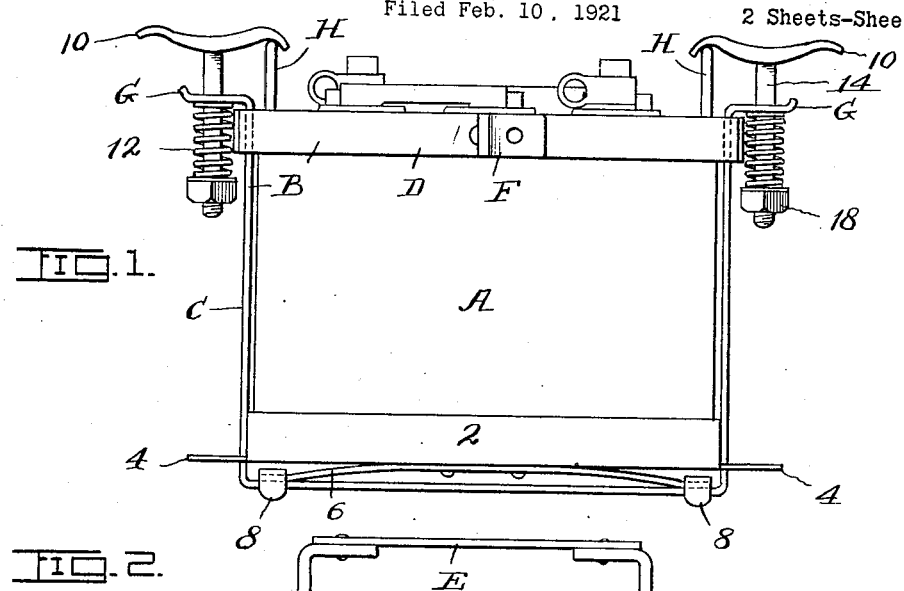
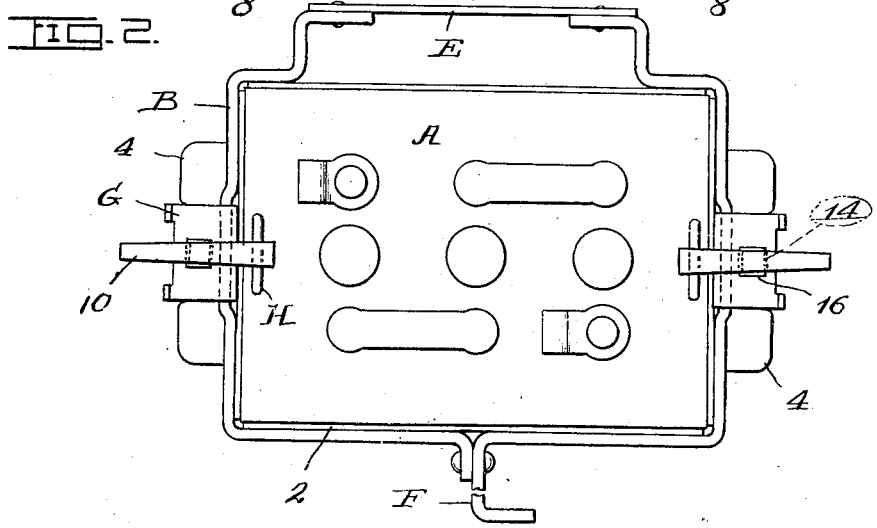
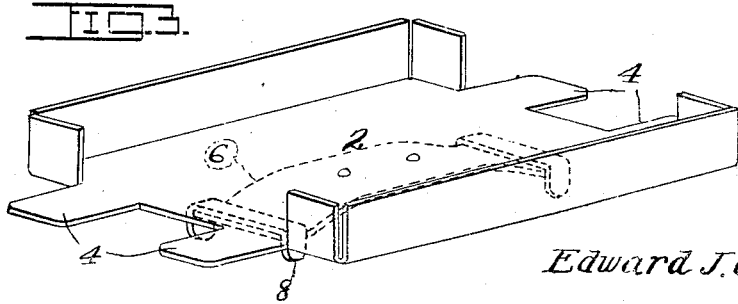
Inventor:
Edward J. Colgan,
Witness:

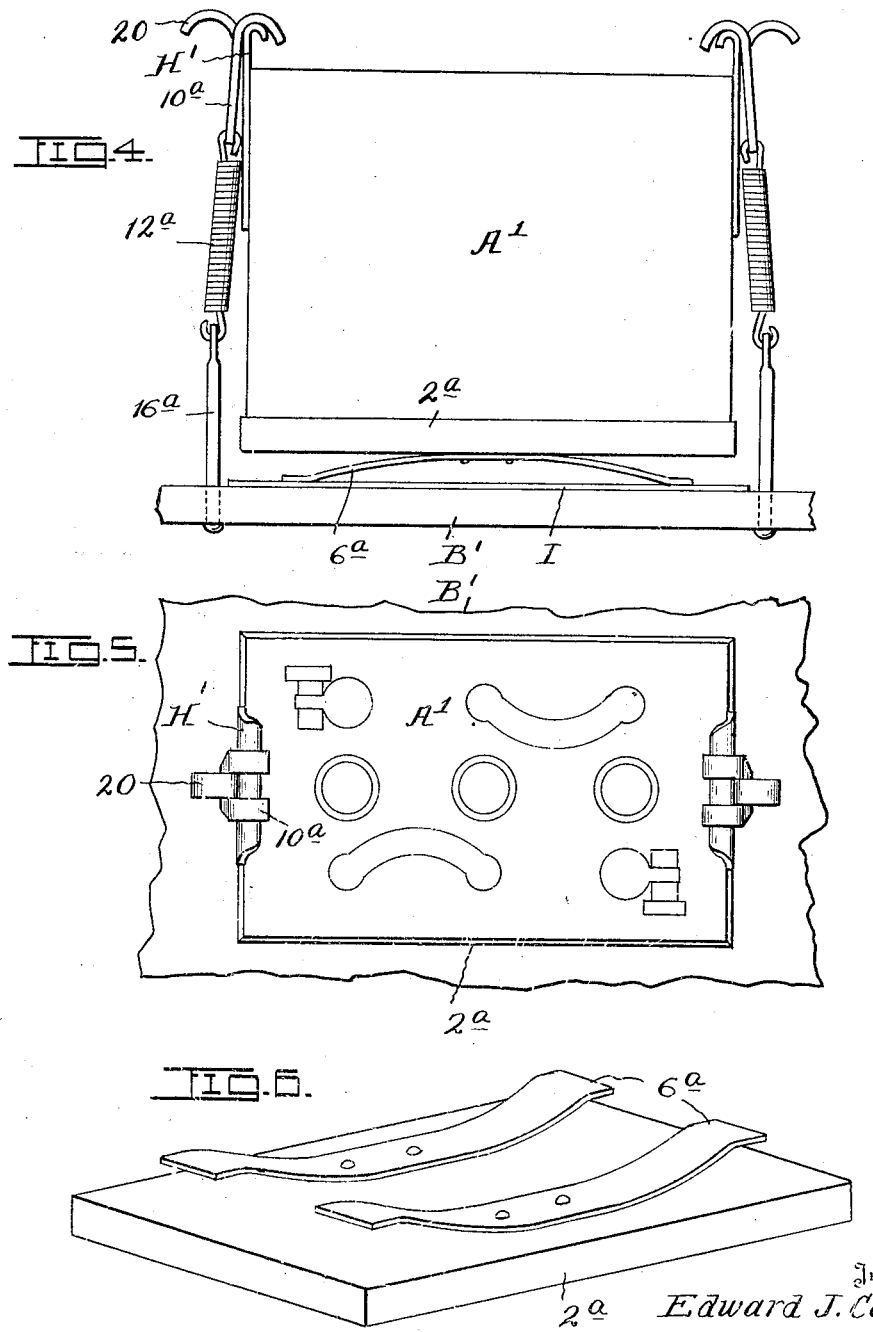

Patented June 26, 1923.

1,459,973

UNITED STATES PATENT OFFICE.

EDWARD J. COLGAN, OF KANSAS CITY, MISSOURI.

BATTERY SHOCK ABSORBER.

Application filed February 10, 1921. Serial No. 443,978.

*To all whom it may concern:*

Be it known that I, EDWARD J. COLGAN, a citizen of the United States, residing at Kansas City, in the county of Jackson and State of Missouri, have invented certain new and useful Improvements in Battery Shock Absorbers, of which the following is a specification.

My invention relates to shock absorbers for use in connection with storage batteries used on motor and other vehicles, and my object is to provide cushioning means for relieving such batteries of vibration and jolts such as occur when the vehicle is in motion.

The usual rigid support in which the battery is mounted subjects the same to considerable shock and vibration which causes the internal plates to sag and damage the supporting top of the battery. The acid solution is also caused to run out on the metal fittings which are thereby corroded.

By employing my device damage to the battery due to the above causes is avoided, as my device absorbs vibration and shock and prevents the transmission thereof to the battery.

In order that the invention may be fully understood, reference will now be made to the accompanying drawings, in which:

Fig. 1 is a side elevation of a battery and its support equipped with the invention.

Fig. 2 is a plan view.

Fig. 3 is a detail perspective view of a tray forming part of the invention.

Fig. 4 is a side elevation of a modified form of the device.

Fig. 5 is a plan view of the parts disclosed by Fig. 4.

Fig. 6 is an inverted perspective view of a modified form of the tray.

Referring first to the form disclosed by Figs. 1 to 3, inclusive, A designates the battery and B the rigid support therefor. The support B comprises in the present instance a vertically-disposed U-shaped metallic strap C and a horizontally disposed rectangular loop D, the side E of which is bolted to the adjacent side of the chassis not shown, while the opposite side has an arm F bolted to the opposite side of the chassis. The U-shaped strap C is rigidly secured at its upper portions to the ends of the loop D and has outturned projections G. All of the foregoing are of a construction employed on a well-known passenger automobile.

Referring now more particularly to the parts constituting the present invention, 2 designates a tray in which the battery A is set. Said tray 2 is provided at its ends with lugs 4 which are spaced apart to straddle the upwardly-extending members of the U-shaped strap C to hold the tray 2 from lateral displacement although permitting it to work freely up and down.

The tray 2 is yieldably supported on suitable cushioning means consisting preferably of springs of any desired form. In the drawings I have shown a bow spring 6 which is riveted or otherwise secured to the bottom of the tray 2 and provided at its ends with depending lugs 8 which straddle the lower horizontal portion of the straps C in order to prevent lateral displacement of the ends of said spring.

The tray 2 is prevented from being jolted upwardly far enough to lift the spring 6 from the strap C, by the weight of the battery A and means for yieldably holding said battery down in position in the tray 2. Said means consists of T-bolts 10 and coil springs 12. One end of each T-bolt head engages over the adjacent handle H of the battery A, while the other end constitutes a handle whereby the T-bolt 10 may be pulled upwardly against the action of the associated spring 12 and turned around to clear the handle H, so that the battery A may be removed when desired.

The upper portions 14 of the T-bolt stems are rectangular to prevent them from turning in corresponding openings 16 in the projecting ends G of the straps C when nuts 18 are rotated to screw them on or off the threaded lower portions of said stems. As shown on Fig. 1, the springs 12 are interposed between the adjacent outturned ends G and the associated nuts 18, which may be manipulated to tension the springs 12 as desired.

By thus yieldably mounting the battery A it is evident that the shocks and vibration transmitted to the support B will be absorbed by the springs 6 and 12 instead of being transmitted to said battery A, and hence no damage can result to the same from such cause.

In the form disclosed by Figs. 4 to 6, inclusive, the battery A' is employed on a well-known form of motor truck and usually placed directly upon the floor B' of a compartment under the seat, where it is subjected to considerable shock and vibration which ofttimes result in serious damage to said battery. In order to relieve the battery A' of such shock and vibration it is set in a tray 2ª provided at its underside with a pair of bow springs 6ª which set upon the floor B', the upper surface of which is protected by a sheet metal cover I from becoming worn by the ends of the springs 6ª. The battery A' is yieldably held in the tray 2ª by hooks 10ª, springs 12ª and eye-bolts 16ª.

The upper ends of the hooks 10ª engage over the handles H' of the battery and are provided with handles 20 whereby said hooks may be lifted out of engagement with the handles H' when it is desired to remove the battery A'. The springs 6ª and 12ª act like the springs 6 and 12 in relieving the battery of shock and vibration and damage resulting therefrom.

While I have shown two forms of the invention I reserve the right to such other forms and modifications as properly fall within the spirit and scope of the claims.

Having thus described my invention, what I claim and desire to secure by Letters Patent, is:

1. In combination with a storage battery and its support, a tray in which the battery is set, and a bow spring interposed between said tray and the battery support and provided with lugs to prevent its displacement relative to the support.

2. In combination with a storage battery and a support therefor having projections at its upper portion, resilient means interposed between the lower portion of the battery and its support to prevent the latter from transmitting shock and vibration to the former, T-bolts extending through the projections on the battery support and engaging over the upper portion of said battery, nuts threaded on the lower ends of said T-bolts, and springs interposed between said nuts and the projections on the battery support to yieldably hold the T-bolts in engagement with the battery.

In testimony whereof I affix my signature, in the presence of a witness.

EDWARD J. COLGAN.

Witness:
L. J. FISCHER.